United States Patent [19]

Goodrow

[11] 3,726,949
[45] Apr. 10, 1973

[54] ALKYL(PHENYL-(4-) SUBSTITUTED 2,2-DICHLOROVINYL PHOSPHATES

[75] Inventor: Marvin H. Goodrow, San Diego, Calif.

[73] Assignee: Shell Oil Company, New York, N.Y.

[22] Filed: July 29, 1971

[21] Appl. No.: 167,512

Related U.S. Application Data

[63] Continuation-in-part of Ser. No. 819,978, April 28, 1969, abandoned.

[52] U.S. Cl. .................260/951, 260/957, 260/971, 424/217, 424/219
[51] Int. Cl. ........................A01n 9/36, C07f 9/08
[58] Field of Search.......................260/951, 957

[56] References Cited

UNITED STATES PATENTS 2,956,073  10/1960  Whetstone et al.....................260/957
3,116,201  12/1963  Whetstone et al.................260/951 X
3,299,190  1/1967  Schrader..............................260/957
3,658,953  4/1972  Poel et al..........................260/957 X Primary Examiner—Lewis Gotts
Assistant Examiner—Richard L. Raymond
Attorney—Marion W. Western et al.

[57] ABSTRACT

Internal helminth parasites of warm-blooded animals are controlled by compounds having the formula:

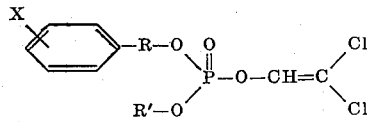

wherein X is a member of the group consisting of hydrogen, methoxy, chlorine or fluorine and R is a $C_4$ hydrocarbon which may be saturated or unsaturated and R' is an alkyl group of one to three carbon atoms.

9 Claims, No Drawings

ALKYL(PHENYL-(4-)SUBSTITUTED 2,2-DICHLOROVINYL PHOSPHATES

This application is a continuation-in-part of Ser. No. 819,978, filed Apr. 28, 1969, and now abandoned.

BACKGROUND OF THE INVENTION

1. Field of the Invention

This invention relates to the control of internal helminth parasites of warm-blooded animals, by employing as an anthelmintic a compound of the formula:

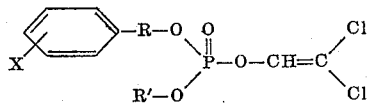

wherein X is hydrogen, methoxy, chlorine or fluorine and R is a saturated or unsaturated $C_4$ hydrocarbon and R' is an alkyl group of one to three carbon atoms.

2. Description of the Prior Art

Dialkyl beta-chlorine-substituted-vinyl phosphates are a known class of insecticides (U.S. Pat. Nos. 2,956,073; 3,116,201; 3,229,190 covering a particular subclass) that also are known to be useful as anthelmintics (U.S. Pat. Nos. 3,166,472; 3,264,184; 3,318,769; Canadian Pat. 731,113). However, as is pointed out in these latter patents, the phosphates of this class are quite toxic to warm-blooded animals, and their therapeutic ratio (ratio of $LD_{50}$ to the dose effective to control the parasites) is not as large as could be desired, and according to these patents, safe use of these compounds as anthelmintics requires that they be formulated in a thermoplastic resin or activated carbon which so controls the rate at which the compound is released in the host animal that the parasites are killed without harm to the animal. Further, these anthelmintics as a class have been found to exhibit relatively low activity with respect to tapeworms.

Alkyl aralkyl beta-chlorine-substituted vinyl phosphates useful as insecticides are generically taught by Belgian Pats. 689,778 and 694,814, however, only methyl benzyl 2,2-dichlorovinyl phosphate is specifically disclosed.

SUMMARY OF THE INVENTION

It has now been found that $C_{1-3}$phenyl-$C_4$-substituted 2,2-dichlorovinyl phosphates possess a markedly superior anthelmintic activity compared to other members of the general class of alkyl aralkyl 2,2-dichlorovinyl phosphates. These compounds are highly active anthelmintics, with respect to one or more species of helminths, yet are relatively non-toxic to warm-blooded animals. Not only are these compounds intrinsically safer, but also exhibit very large safety factors over their homologs. The magnitude of the safety factors of these compounds is evident from the fact that they can be safely administered to animals by persons without special training, and without exercising more than ordinary care, and without the necessity for special formulation.

DESCRIPTION OF THE PREFERRED EMBODIMENTS

The preferred compounds of this invention can be described by the general formula:

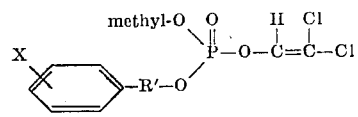

wherein X is hydrogen, methoxy, chlorine or fluorine and R' is a hydrocarbon having the formula $C_4H_8$, $C_4H_6$ or $C_4H_4$.

Representative of such compounds are methyl 4-phenylbutyl 2,2-dichlorovinyl phosphate methyl 4-phenyl-3-butenyl 2,2-dichlorovinyl phosphate methyl 4-phenyl-1,3-butadienyl 2,2-dichlorovinyl phosphate methyl 4-phenyl-3-butynyl 2,2-dichlorovinyl phosphate methyl 4-(4-chlorophenyl)butyl 2,2-dichlorovinyl phosphate methyl 4-(4-fluorophenyl)butyl 2,2-dichlorovinyl phosphate methyl 4-(4-methoxyphenyl)butyl 2,2-dichlorovinyl phosphate Especially preferred is methyl 4-phenylbutyl 2,2-dichlorovinyl phosphate.

The activity of the compounds of this invention with respect to helminth-parasites of warm-blooded animals, and their relatively low toxicity with respect to the host animals — that is, their high therapeutic ratio — was demonstrated by the following tests:

Mammalian Toxicity

This is defined as the $LD_{50}$, milligrams of test compound per kilogram of animal body weight, and was determined as follows: by intubation a group of mice was treated with various dosages in milligrams of test compound per kilogram of mouse body weight. The dosage at which 50 percent of the mice died was the $LD_{50}$.

Anthelmintic Activity

This is reported as the minimum effective dosage, milligrams of test compound per kilogram of animal body weight, to effect a certain standard of clearance of parasites from the host animal. It was determined in any given case as follows: A group of 5 mice, parasitized by tapeworm (Hymenolepis nana) and pinworms (Syphacia obvelata), was treated, by intubation with a single dose of the test compound, the dosage being less than the $LD_{50}$. The treated mice were kept from feed and water for 24 hours following treatment, then the mice were sacrificed and the intestinal tract was examined for the presence of parasites. If 60 percent or more of the mice were completely cleared of one and/or the other of the species of parasites, the test was replicated and if the results were confirmed, additional groups of parasitized mice were treated with successively lower dosages of the test compound to ascertain the minimum dosage required to clear 60 percent or more of the mice completely of one and/or the other of the two species of parasites.

Therapeutic Ratio

This is expressed as the ratio of the $LD_{50}$ to the minimum effective dose (M.E.D.). Obviously, the higher the therapeutic ratio the safer the compound is for administration to warm-blooded animals.

Representative compounds of the invention were evaluated according to this procedure, as was the benzyl homolog disclosed in the prior art. The results were as follows:

Table I

| Compound | $LD_{50}$* (mg/kg) | M.E.D. (mg/kg) | | Therapeutic Ratio | |
|---|---|---|---|---|---|
| | | Tape-worm | Pin-worm | Tape-worm | Pin-worm |
| Methyl benzyl 2,2-dichlorovinyl phosphate | 60 | 16 | 4 | 4 | 15 |
| Methyl 4-phenylbutyl 2,2-di-chlorovinyl phosphate | 600 | 4 | 2 | 150 | 300 |
| Methyl 4-(4-chlorophenyl)-butyl 2,2-dichlorovinyl phosphate | 700 | 31 | 16 | 22 | 44 |
| Methyl 4-(4-fluorophenyl)butyl 2,2-dichlorovinyl phosphate | 410 | 31 | 31 | 13 | 13 |
| Methyl 4-(4-methoxyphenyl)-butyl 2,2-dichlorovinyl phosphate | 600 | 16 | 4 | 38 | 150 |

*Estimated

From the results of these tests, it is clearly evident that the methyl 4-phenylbutyl 2,2-dichlorovinyl phosphate and its 4-methoxy, 4-chloro and 4-fluoro analogs while having high anthelmintic activity, have a much lower mammalian toxicity, thus having much higher therapeutic ratio as well as higher intrinsic safety.

The compounds of the invention may be prepared by several synthesis techniques which are applicable to the preparation of mixed esters of beta, beta-dihalovinyl phosphates, generally. For example, the compounds may be prepared by treating the anhydride, P,P'-bis(2,2-dichloro-vinyl) P,P'-$C_{1-3}$ alkyl pyrophosphate with the appropriate phenyl-$C_4$- alcohol. The anhydride starting material and general method of preparing mixed alkyl 2,2-dichlorovinyl phosphates by treating said anhydride with the appropriate alcohol is described in detail in copending application Ser. No. 654,973, filed July 31, 1967.

Another synthesis technique which has been found suitable utilizes the classic Perkow reaction for preparation of phosphate esters. With this procedure the appropriate mixed pohsphite ester is reacted with chloral to form, with the elimination of a lower alkyl halide, the desired 2,2-dichlorovinyl mixed phosphate ester. When preparing the compounds of the invention with this procedure, it has been found convenient to use, as the mixed phosphite ester starting material, a mixed ester wherein two of the ester groups are methoxy and the other is the appropriate phenyl- or substituted phenyl-$C_4$-alkoxy. These mixed phosphite ester starting materials may be prepared by reacting trimethyl phosphite with the appropriate phenyl- or substituted phenyl-$C_4$-alcohol in the presence of phosphoric acid. Since, in the preparation of these mixed phosphite ester starting materials, other possible phosphite esters are usually formed, it is desirable to further purify and isolate the desired phosphite ester by conventional techniques such as fractional distillation. Also, due to the possibility of disproportionation, care should be taken to insure that the mixed phosphite ester is not contaminated with water prior to its reaction with chloral. Normally, this can be accomplished by performing all experimental procedures under a nitrogen atmosphere.

The compounds of this invention can be employed as an anthelmintic by the conventional means and techniques employed in the anthelmintic art.

Methyl phenyl-$C_4$- 2,2-dichlorovinyl phosphate can be used to control a wide spectrum of endoparasitic roundworms, pinworms, whipworms, hookworms, threadworms, cecal worms, stomach worms, hairmworms, threadnecked worms, cooperias, and the like. Some may act topically, some may act systemically, and thus can control such endoparasites as the larvae of heel flies, bomb flies, bot flies and the like Thus, the compound of this invention can be used to control species of endoparasites of the genera: *Haemonchus, Trichostrongylus, Ostertagia, Cooperia, Trichuria, Oesophagostomum, Strongloides, Ascaris, Nematodirus, Ancylostoma, Necator, Gasterophilus, Nematospiroides, Syphacia*, to name some typical genera.

This compound can further be used to control flatworms (tapeworms) of the *Cestoda*, such as species of the Genera: Hymenolepis Moniezia, *Anoplocephala, Paranocephala, Thysanosoma, Taenia, Multiceps, Echinococcus, Diplidium, Diphyllobothrium, Mesocestoides*, and the like.

These new anthelmintics are effective in controlling endoparasites of mammals and birds, generally, and more particularly, in controlling endoparasites in livestock, such as cattle, swine, sheep and goats, in domestic pets, such as dogs and cats, in rabbits, in poultry such as chickens, turkeys, ducks, geese and the like, and in fur-bearing animals, such as mink, foxes, chinchilla, and the like.

They can be used to eradicate parasites already present, and/or they can be used prophylatically — that is, they can be used to cure an already present work infestation, and can be used to prevent infestation.

The dosage of the anthelmintic to be used will depend upon the particular kind or kinds of parasites to be controlled, the kind of host animal, whether the anthelmintic is to be used to cure an already existing infection, or merely as a prophylactic, and the like. These factors are those ordinarily encountered in the treatment of animals to cure and/or prevent their infestation by endoparasites; these factors and their solution are all well known to the practitioners of the art. In general, however, larger dosages are required to cure an already existing infestation than are required for prophylaxis. Thus, dosages of the anthelmintic to provide as little as 1 milligram of the anthelmintic per kilogram of the live body weight of the animal fed at regular intervals — twice daily or daily, for example — may be sufficient to prevent infestation of animals by endoparasites. However, prophylactic dosages ordinarily will amount to about 2–10 milligrams of the anthelmintic per kilogram of the animal body weight. The dosage required to eradicate already existing endoparasites ordinarily will be at least about 5 milligrams of the anthelmintic per kilogram of the animal body weight, with usual dosages being about 5 to 50 milligrams on the same basis. The maximum dosage, of course, in every case will be determined by the toxicity of the anthelmintic to the host animal. The anthelmintic of this invention provides an excellent therapeutic ratio — effectively eradicating endoparasites without ill effect upon the host animal.

The invention is further illustrated by the following examples:

EXAMPLE I 9.9 grams of 4-phenylbutanol and 33.0 grams of P,P'-bis(2,2-dichlorovinyl) P,P'-dimethyl pyrophosphate were mixed at 25°C causing the temperature of the solution to rise to 45°C. The mixture was then heated to 60°–65°C and held there for a period of three hours. The mixture was then cooled, diluted with 300 mls of methylene chloride and washed successively with 100 mls of water, 100 mls of saturated aqueous sodium bicarbonate solution and 100 mls of saturated aqueous sodium chloride solution. The methylene chloride solution was dried over sodium sulfate and the solvent was stripped off under water aspirator vacuum leaving a light brown oil residue. The residue was distilled at 160°C/0.0004 mm in a molecular still to obtain an amber mobile liquid which was identified as methyl 4-phenylbutyl 2,2-dichlorovinyl phosphate by elemental analysis. Analysis (% by weight):

Calculated:   P – 9.1; Cl – 20.9
Found:        P – 9.1; Cl – 22.1

The identity of the product was confirmed by infrared spectrum analysis. Nuclear magnetic resonance analysis indicated the product to be about 90 percent methyl 4-phenylbutyl 2,2-dichlorovinyl phosphate.

Another preparation on a larger scale gave methyl 4-phenylbutyl 2,2-dichlorovinyl phosphate in 80 percent yield; 96 percent purity by GLC.

EXAMPLE II 2.5 grams of 4-phenyl-3-butenyl alcohol and 7.2 grams of P,P'-bis(2,2-dichlorovinyl) P,P'-dimethyl pyrophosphate were mixed at ambient temperature causing the temperature of the solution to rise to 29°C. The solution was heated at 65°C for 2 hours and then cooled and worked up as in Example I. The compound obtained was identified as methyl 4-phenyl-3-butenyl 2,2-dichlorovinyl phosphate.

EXAMPLE III

The compound of Example II was used to treat mice and rats by intubation to determine the maximum tolerated dosage (M.T.D.) in milligrams of test compound per kilogram of body weight. In both instances the M.T.D. was about 500 mg/kg. The anthelmintic activity of this compound in mice and rats was tested according to the procedure already described. In mice infested with tapeworm (*Hymenolepis nana*) and pinworm (*Syphacia obvelata*) a therapeutic ratio of 4 and 16 respectively was established. In rats infested with roundworm (*Nippastrongylus braziliensis*) a therapeutic ratio of 4 was obtained. The activity against pinworm in rats was surprising in view of the fact that the prior art methyl benzyl 2,2-dichlorovinyl phosphate was inactive.

EXAMPLE IV 12.2 grams of 4-(4-chlorophenyl) butanol was mixed with 26.4 grams of P,P'-bis(2,2-dichlorovinyl) P,P'-dimethyl pyrophosphate causing the temperature of the mixture to rise to 42°C. The mixture was heated at 65°C for 2.5 hours and then cooled and worked up in a manner similar to that described in Example I. The product (12.9 grams) was methyl 4(4-chlorophenyl)butyl 2,2-dichlorovinyl phosphate.

EXAMPLE V 8.4 grams of 4-(4-fluorophenyl) butanol was mixed with 20.0 grams of P,P'-bis(2,2-dichlorovinyl) P,P'-dimethyl pyrophosphate causing the temperature to rise to 40°C. The mixture was heated at 65°C for 2.5 hours and then cooled and worked up as described in Example I. The yield of product (10.3 grams) was identified as methyl, 4(4-fluorophenyl)butyl 2,2-dichlorovinyl phosphate.

EXAMPLE VI

Using the procedure described in Example I but substituting P,P'-diethyl pyrophosphate or P,P'-dipropyl pyrophosphate for P,P'-dimethyl-pyrophosphate yields products identified as ethyl 4-phenylbutyl 2,2-dichlorovinyl phosphate and propyl 4-phenylbutyl 2,2-dichlorovinyl phosphite respectively.

EXAMPLE VII

A trace (2–4 microliters) of 85 percent phosphonic acid was added from a microliter syringe to a stirred mixture of 70 grams of trimethyl phosphite and 20.6 grams of 4-(4-methoxyphenyl)butyl alcohol under a nitrogen atmosphere. The reaction mixture was heated and the by-product methanol and excess trimethyl phosphite were removed by distillation in a vacuum through a foot long Vigreux column to terminal conditions of 172°–175°C and 8 mm Hg. Fifty-four grams of distillate was collected which was redistilled under vacuum through a 3-ball Schneider column to give 3 fractions. The second fraction, 18.8 grams, boiling at 172°–175° at reduced pressure (8 mm Hg) was collected in a 3-necked flask equipped with a stirrer and gas tight syringe stopper. 10.2 grams of chloral was added with stirring to the second distillate fraction over a 5 minute period. The reaction was exothermic and a dry-ice acetone bath was applied periodically during the chloral addition to maintain the reaction temperature at less than 40°C. Upon completion of the addition the reaction mixture was allowed to stand at 27°C for 2 days. After standing the reaction mixture was poured into 100 milliliters of benzene, washed with 100 milliliters of 0.1 N ammonium hydroxide and phase separated. The aqueous phase was then washed with 100 milliliters of benzene and the two benzene extracts were combined and washed with 100 milliliters of water. The organic phase was then dried over anhydrous magnesium sulfate and the solvent was removed by distillation in a vacuum to yield 25.2 grams of residue. The residue was then purified by triple distillation through a molecular still to yield 12.9 grams of methyl 4-(4-methoxyphenyl)butyl 2,2-dichlorovinyl phosphate coming off as the volitile fraction at 105°–100°C and 0.6 mm Hg on the third pass through the still. The identity of the product was confirmed by elemental infrared spectrum and nuclear magnetic resonance analyses.

I claim as my invention:

1. A compound having the formula

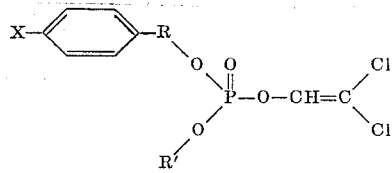

wherein X is chlorine, methoxy, fluorine or hydrogen, R is a C₄ hydrocarbon which may be saturated or unsaturated, and R' is an alkyl group of one to three carbon atoms.

2. A compound according to claim 1 wherein R' is methyl.

3. A compound according to claim 2 wherein X is hydrogen and R is —CH₂CH₂CH₂CH₂—.

4. A compound according to claim 2 where

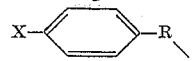

is 4(4-chlorophenyl)butyl.

5. A compound according to claim 2 where

is 4(4-fluorophenyl)butyl.

6. A compound according to claim 2 where

is 4(4-methoxyphenyl)butyl.

7. A compound according to claim 2 wherein X is hydrogen and R is —CH=CHCH₂CH₂—.

8. A compound according to claim 2 wherein X is hydrogen and R is —CH=CHCH=CH—.

9. A compound according to claim 2 wherein X is hydrogen and R is butynylene.

* * * * *